Jan. 22, 1963
L. VAN HESS
3,074,096
COMBINATION DEICER AND WINDSHIELD WIPER BLADE CONSTRUCTION
Filed March 21, 1961
2 Sheets-Sheet 1
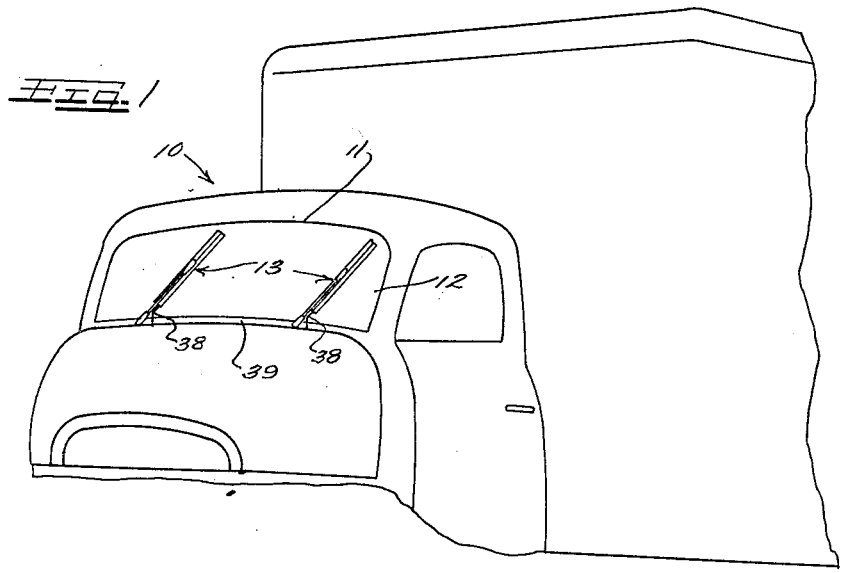
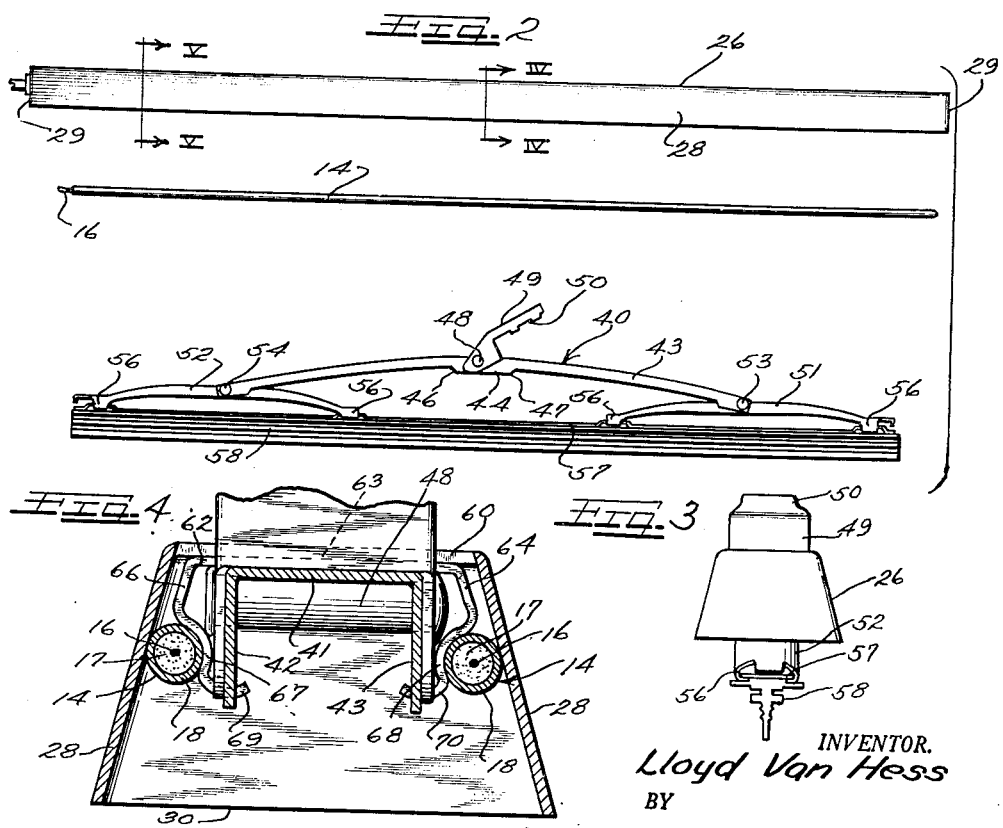
INVENTOR.
Lloyd Van Hess
BY
Hill, Sherman, Meroni, Gross & Simpson
ATTORNEYS

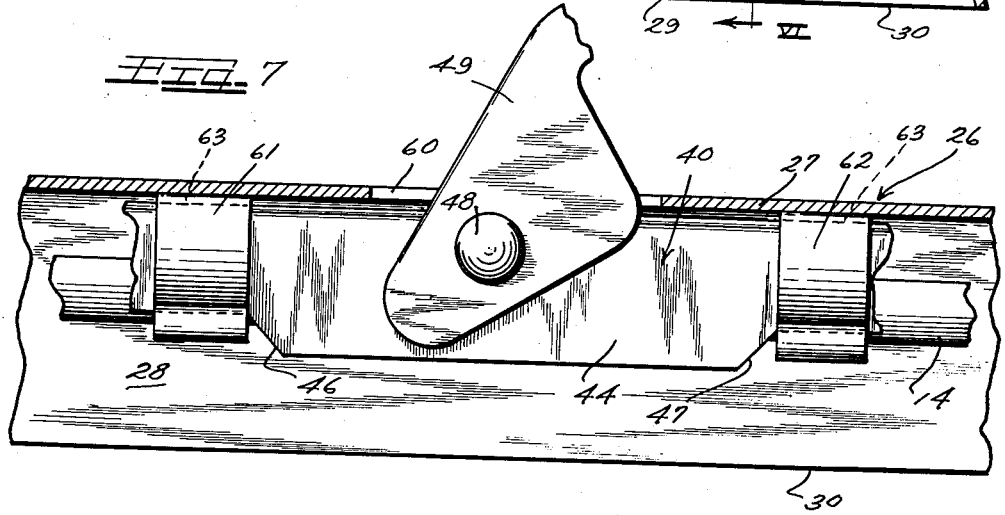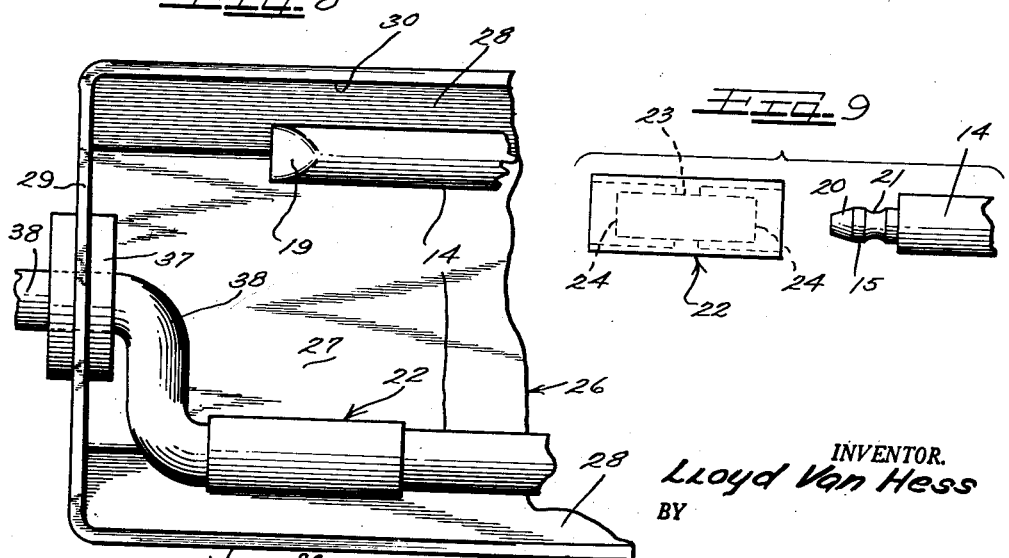

United States Patent Office 3,074,096
Patented Jan. 22, 1963

3,074,096
COMBINATION DEICER AND WINDSHIELD
WIPER BLADE CONSTRUCTION
Lloyd Van Hess, Chicago, Ill., assignor to Plans &
Products, Inc., Chicago, Ill., a corporation of Illinois
Filed Mar. 21, 1961, Ser. No. 97,192
12 Claims. (Cl. 15—250.07)

This invention relates generally to a deicer construction for use with a windshield wiper blade operable in an atmospheric environment in which snow and ice is likely to accumulate on a windshield surface.

Although automobiles and trucks are generally equipped with so-called defrosters which direct a flow of conditioned air against the surface of a windshield, such provision is not effective in solving the problem of ice and snow accumulation on the windshield wiper blade, per se. First of all, such conditioned air is usually directed against the inside surface of the windshield, whereas the snow and ice accumulation occurs on the outside surface of the windshield. Further, even if the accumulation of ice or snow is prevented on the actual windshield surface, accumulations will occur on the wiper blade, per se, rendering the wiper blade rigid and virtually inoperable.

The problem of snow and ice accumulation on windshield wiper blades becomes particularly acute in operating an automotive vehicle under adverse road conditions which frequently occur in colder climates where snow falls or other atmospheric icing conditions exist. Although the driver of a pleasure car may decide not to drive such vehicle under adverse operating conditions, commercial automotive vehicles such as buses and trucks must necessarily be continued to be operated and consequently there is a genuine need for a wiper blade construction which will provide an effective solution of the problem of ice and snow accumulation.

According to the principles of the present invention, a replaceable windshield wiper blade of the type having a metal frame carrying a flexible squeegee is provided. Preferably, the windshield wiper blade has a wiper or squeegee of the type which is particularly adapted to engage and wipe against the curved surface of an automotive windshield. Thus, in one exemplary form of windshield wiper blade construction, there is provided a main frame having a lever arm or head by means of which the wiper blade may be connected to a wiper actuating arm and the squeegee is supported by a pair of longitudinally spaced brackets or subframe, thereby insuring maximum flexibility of the wiper or squeegee.

In accordance with the present invention, the heating means is particularly characterized by the utilization of a sheathed tubular member including an electrical resistance wire embedded in a material such as powdered magnesium oxide, in turn, enclosed within a thin rigid tube.

Further, according to the present invention, a through-shaped reflector member has a plurality of longitudinally spaced brackets each including spring arms spaced from opposite diverging side walls of the reflector member and forming snap-in sockets sized to be cooperative with the tubular heating element. The tubular heating element is generally U-shaped in overall configuration, including two legs coextensive in length with the wiper blade. Thus, the heating element may be snapped in to assembly within the trough. Retainer means are also provided to connect the trough-shaped reflector in firm assembly with the frame of the wiper, thereby positioning the flexible squeegee element in the open side of the trough in the path of the thermal energy reflected and radiated outwardly. Being flanked on both longitudinal sides by the heating element, the flexible squeegee is surrounded with thermal energy, thereby preventing the accumulation of snow and ice and keeping the wiper or squeegee flexible and operative.

It is an object of the present invention to provide an improved windshield wiper blade construction.

Yet another object of the present invention is to provide a deicer construction which is particularly suited for use with a windshield wiper blade organization adapted to be operated in atmospheric environmental conditions including snow and ice accumulations on a windshield surface.

A further object of the present invention is to provide an improved combination deicer apparatus and windshield wiper blade.

Yet another object of the present invention is to provide an improved heating element arrangement which can be quickly and conveniently snapped into assembly with a reflector trough.

A still further object of the present invention is to provide a heating element having a line connector current continuing means associated therewith to facilitate connection into the electrical circuitry of an automotive vehicle.

Many other features, advantages and additional objects of the present invention will become manifest to those versed in the art upon making reference to the detailed description which follows and the accompanying sheets of drawings in which a preferred structural embodiment of a deicer apparatus for use with a windshield wiper blade is shown by way of illustrative example.

On the drawings:

FIGURE 1 is a fragmentary view illustrating the application of the present invention to an automotive vehicle such as a truck utilizing a windshield wiper blade organization on the outside surface of a curved windshield and to which has been applied the deicer apparatus of the present invention;

FIGURE 2 is an exploded view showing the reflector, the heating element and the wiper blade forming the windsheld wiper blade organization of the present invention;

FIGURE 3 is an end elevational view of the combination deicer apparatus and windshield wiper blade construction;

FIGURE 4 is a cross-sectional view illustrating additional details of construction and taken substantially in the plane of line IV—IV of FIGURE 2;

FIGURE 5 is a cross-sectional view taken substantially in the plane of line V—V of FIGURE 2;

FIGURE 6 is a fragmentary cross-sectional view taken substantially on line VI—VI of FIGURE 5;

FIGURE 7 is a fragmentary cross-sectional view with parts broken away and with parts shown in section illustrating additional details of construction of the invention;

FIGURE 8 is a fragmentary bottom plan view of one end of the trough-shaped member with the wiper blade removed to illustrate additional details of construction of the heating element; and FIGURE 9 is a fragmentary exploded view illustrating additional details of construction of the heating means.

As shown on the drawings:

It should be understood that the present invention has particular utility when applied to all weather vehicles such as buses and trucks, although the principles of the present invention are generally applicable to any windshield wiper blade construction used on an automotive vehicle. For purposes of illustration, the invention is described as being applied to a truck-type automotive vehicle 10 having a windshield 11 which may be shaped out of a flat plane to have substantially curved portions, thereby forming a curved windshield surface 12 engaged by a pair of windshield wiper blade constructions of the present invention illustrated generally by the reference numeral 13. It will be understood that each of the windshield wiper blade constructions 13 is identical and, accordingly, a description of one of the devices will be given in detail.

It is contemplated, according to the present invention, to provide a generally elongated tubular heating element 14 which comprises an electrical resistance wire 16 made of nichrome or some other suitable material having good heating characteristics.

In order to provide radial support for the resistance wire 16 and in order to evenly dissipate thermal energy generated upon energization of the resistance wire 16, the wire 16 is embedded in a quantity of material such as powdered magnesium oxide, indicated at 17, which, in turn, is contained within an elongated rigid thin-walled tube 18. The ends of the tube 18 are closed by suitable means, for example, the end may be pinched as at 19 without, of course, short-circuiting the outer tube 18 to the resistance wire 16, or the tube could also be closed by suitable electrically non-conductive disks. In accordance with the principles of the present invention, one end is closed by a pinched portion as at 19, while the opposite end of the heating element 14 has the resistance wire 16 thereof connected to a plug connector 15 suitably insulated from the outside retainer tube 18. The plug connector 15 has a tapered finding portion 20 and also an annular indented recess 21, thereby facilitating insertion of the plug connector 15 into one end of a line connector shown generally at 22 and including a current-continuing means 23 having socket portions 24, 24 at opposite ends.

The heating element 14 is associated with a generally trough-shaped reflector member indicated at 26. More specifically, it will be noted the reflector member 26 has a bottom wall 27 and side walls 28, 28 which diverge generally outwardly away from the bottom wall 27. The reflector member 26 also has end walls shown at 29 and the entire side of the reflector member 26 opposite the bottom wall 27 is open as at 30.

The entire inner side of the wall portions 27, 28 and 29 of the reflector member 26 may be formed to provide a reflective surface so that any radiant thermal energy impinged thereupon will be reflected generally outwardly of the opening 30.

In accordance with the principles of the present invention, the tubular heating element 14 is removably assembled in the trough-shaped reflector 26 by a special attaching means. Thus, at longitudinally spaced points along the elongated length of the reflector trough 26, there is located a bracket shown at 31 having a body portion 32 connected in firm assembly to said bottom wall 27, for example, by spot-welding or any other suitable fastening means. The bracket further includes a spring arm 33 on each side of the body portion 32 and each spring arm 33 extends in spaced adjacency to a corresponding diverging side wall 28. Each spring arm 33 has a recessed retaining portion 34 near one end and a shaped end portion 36 which is somewhat reversely bent, thereby to form with the adjoining wall 28 an entrance throat, while the recessed portion 34 forms with the adjoining wall 28 a snap-in socket. The brackets 31 are made of a material providing suitable resiliency to the spring arms.

In order to bring electric current to the heating element 14, one end wall 29 of the reflector 26 is apertured to receive a rubber grommet 37 through which passes a sheathed conductor wire 38. The sheathed conductor wire 38 has on the free end thereof a plug connection similar to the plug connection 15, shown in FIGURE 9, and connection is made to the current-continuing means 23 by plugging the same into one of the socket ends 24 of the line connector 22. The other end of the conductor wire 38 may be led to a suitable source of energization through the cowling 39 of the vehicle in the usual manner.

As shown in FIGURE 2, the exemplary wiper blade with which the present invention is illustrated takes the form of a main frame 40 of the channel-shaped configuration including a body wall 41 and two side walls 42 and 43. At the center section of the main frame 40, the side walls 42 and 43 each have lug portions shown at 44, thereby to provide longitudinally spaced shoulders 46 and 47. The lug portions 44 are also apertured to receive a pivot pin 48, thereby to pivotally connect a head member or lever arm 49 which is likewise formed in channel shape so as to straddle the lug portions 44. The head member or lever arm 49 has a coupling portion 50 by means of which the wiper blade may quickly and conveniently be connected to the actuating arm of a wiper blade actuating mechanism forming part of the operating equipment of the vehicle 10.

At opposite ends of the main frame 40, there is provided a subframe 51 and 52, respectively, each connected to the main frame 40 by a corresponding pivot pin 53 and 54. Each subframe 52 and 51 is, in turn, formed as a channel-shaped member and has retainer lug portions 56 formed at the respective ends thereof for engaging and retaining a flexible metal backing strip 57. The flexible strip 57 is apertured to receive and retain a rubber squeegee member 58.

As is clearly shown in FIGURES 4 and 7, the wall 27 has formed therein an opening 60 which is disposed centrally of the longitudinal length of the reflector member 26. Spaced on opposite sides of the opening 60 is a pair of brackets generally similar to the brackets 32 already described, but identified herein for better identification at 61 and 62, respectively. Each bracket 61 and 62 has a body portion 63 fastened in firm assembly to the wall 27 and spring arms on opposite sides thereof 64 and 66 bent to provide a recessed socket portion 67 and 68, thereby to cooperate with the heating element 14. Unlike the other brackets 32, however, the free end of each of the brackets 61 and 62 at the respective spring arms 64 and 66 is inwardly bent as at 69 and 70, respectively, thereby to underlie the side walls 42 and 43 adjacent the shoulders 46 and 47 for locking the main frame in firm assembly with the reflector 26. The head member or lever arm 49 extends through the opening 60, thereby facilitating attachment to a windshield wiper actuating mechanism.

By virtue of the arrangement provided, the squeegee 58 is positioned in register with the opening 30 in the path of thermal energy radiated and reflected out of the opening 30. Because of the alignment of the two legs of the heating element 14, the squeegee element is virtually straddled. Although the windshield wiper blade is actually positioned inside of the trough-shaped reflector 26, it will be noted that the side walls 28, 28 of the reflector 26 terminate short of the squeegee 58. In other words, the squeegee 58 extends outwardly through the opening 30 but is positioned in the path of flow of all thermal energy passing through the opening 30 towards the surface 12 of the windshield 11.

Because the heating element 14 is carried in such a manner as to position a corresponding leg on opposite sides of the frame assembly, the thermal energy generated thereby upon energization of the wire 16 will be directed outwardly through the opening 30. Moreover, any thermal energy generated by the heating element 14 which passes in other directions, will impinge upon the reflective surface formed on the inside walls of the reflector member 26 and thereupon radiate outwardly through the opening 30 to surround the squeegee 58 with thermal energy.

By virtue of such arrangement, the formation of ice and snow accumulations on the windshield wiper blade is substantially precluded without serious detriment to the squeegee 46. Thus, the squeegee 46 is maintained operative regardless of the severity of the atmospheric environmental conditions and the operator of the vehicle 10 may proceed with maximum visibility even under adverse driving conditions.

Although minor modifications might be suggested by those versed in the art, it should be understood that I wish to embody within the scope of the patent warranted hereon all such modifications as reasonably and properly come within the scope of my contribution to the art.

I claim as my invention:

1. For use in a windshield wiper organization operable in atmospheric environmental conditions including snow and ice accumulations on the windshield surface, in combination, heating means comprising a generally trough-shaped reflector member having an opening extending along the length of one side thereof, a bottom wall extending along the length of the opposite side thereof, and side walls diverging generally outwardly away from said bottom wall, a plurality of fastening brackets spaced longitudinally in said trough of said reflector member, each said fastening bracket having a spring arm spaced inwardly from an adjoining side wall of said reflector member to form together with said side wall a snap-in socket, and a generally tubular heating element removably received in snap-in assembly in said sockets and positioned in said trough to distribute thermal energy outwardly through said opening, a windshield wiper blade in said reflector member comprising a frame, some of said bracket members having retaining means connected to said frame, and a flexible squeegee substantially coextensive in length with said opening and extending through said opening outwardly of said side walls of said reflector member, said windshield wiper being free to flexibly conform to the curved surface of an adjoining windshield surface and being directly interposed in the path of thermal energy radiating outwardly through said opening.

2. In a heated windshield wiper organization including a replaceable flexible squeegee windshield wiper blade for a curved windshield and having a main wiper frame and a pair of spaced subframes carried thereby, said main frame having a pivoted lever connected to a windshield wiper actuating member, an elongated tubular heater at least coextensive in overall length with said wiper blade, a reflector member of trough-shaped configuration having reflective walls diverging outwardly to form an opening opposite said heater, longitudinally spaced snap fasteners in said trough together with the walls of the trough removably mounting said heater in said trough, said reflective member having a centrally disposed aperture and retainer means adjacent said aperture for interconnecting said main frame and said reflector member with the lever extending through said aperture and with said wiper blade positioned in said opening of said reflector member, whereby heat radiated and reflected through said opening will surround said windshield wiper blade.

3. In combination, heating means comprising a generally trough-shaped reflector member having an opening extending along the length of one side thereof, a bottom wall extending along the length of the opposite side thereof, and side walls diverging generally outwardly away from said bottom wall, longitudinally spaced snap fastening means in the trough of said reflector member, and a generally tubular heating element removably received in snap-in assembly in and with said trough by said snap fastening means to radiate thermal energy outwardly through said opening, said heating element comprising a centrally disposed electrical resistance wire supported by a supply of material such as magnesium oxide, in turn, enclosed by a rigid thin-walled tubular housing, a windshield wiper blade in said reflector member comprising a frame, retainer means in said reflector member connected to said frame, and a flexible squeegee substantially coextensive in length with said opening and extending through said opening outwardly of said side walls of said reflector member, said windshield wiper being free to flexibly conform to the curved surface of an adjoining windshield surface and being directly interposed in the path of thermal energy radiating outwardly through said opening for operation despite the adversity of atmospheric environmental conditions.

4. In a heated windshield wiper organization including a replaceable flexible squeegee windshield wiper blade for a curved windshield and having a main frame and a pair of subframes carried thereby, an elongated tubular heater bent to form two separate legs extending coextensively in length with said wiper blade, a trough-shaped reflector having divergent walls on opposite sides of said wiper blade and forming an opening in register with said wiper blade, snap-in fasteners in said reflector and together with the walls of said reflector removably receiving said tubular heating element with each leg of said heater disposed adjacent a corresponding longitudinal wall of said reflector to radiate and reflect thermal energy out of said opening, and retainer means intersecting said wiper blade and said reflector at said main frame with said wiper blade positioned between said legs to be surrounded by thermal energy reflected and radiated out of said opening.

5. In a heated windshield wiper organization as defined in claim 4,
one leg of said heater having at the free end thereof a plug,
said reflector member having at one end thereof a conductor wire extending through said one end and into said trough,
a plug on the end of said conductor wire,
and a current-continuing means comprising
a line connector having sockets at opposite ends each receiving one of said plugs to electrically energize said heater.

6. In a heated windshield wiper organization as defined in claim 5,
said heating element comprising a centrally disposed electrical resistance wire
supported by a supply of material such as powdered magnesium oxide, in turn,
enclosed by a rigid thin-walled tubular housing.

7. In a heated windshield wiper blade organization operable in atmospheric conditions including snow and ice accumulations on a windshield surface, an elongated trough-shaped reflector having a bottom wall, diverging side walls, and an open side, a plurality of longitudinally spaced brackets each including a generally strip-form member having a body portion connected to said bottom wall and a spring arm extending in spaced adjacency to each corresponding diverging side wall, each said spring arm having a recessed retaining portion near one end and each spring arm being resiliently yieldable to form together with an adjoining side wall of said reflector a snap-in socket, a sheathed tubular electrical heating element having an outer diameter sized to be snapped into and retained by said sockets, and retainer means in said reflector for connection of said reflector to the frame of a windshield wiper with the squeegee positioned in said open side, thereby to be surrounded by thermal energy reflected and radiated out of the open side.

8. In a heated windshield wiper blade organization as defined in claim 7,
said heating element being bent to form two separate legs extending coextensively in length with said squeegee,
each leg of said heating element being disposed adjacent a corresponding diverging side wall.

9. In a heated windshield wiper blade as defined in claim 8, one leg of said heater having at the free end thereof a plug, said reflector having a conductor wire extending through one end thereof into said trough, a plug on the end of said conductor wire, and a current-continuing means comprising a line connector formed with sockets at opposite ends each receiving one of said plugs to electrically energize said heating element.

10. In a heated windshield wiper blade organization as defined in claim 8,
    said heating element comprising a centrally disposed electrical resistance wire
        supported by a supply of material such as magnesium oxide, in turn,
            enclosed by a rigid thin-walled tubular housing.

11. For use as a windshield wiper heater, a trough-shaped reflector member having a bottom wall and diverging side walls, a plurality of longitudinally spaced brackets each including a generally strip form member having a body portion connected to said bottom wall and a spring arm extending in spaced adjacency to a corresponding diverging side wall, each said spring arm having a recessed retaining portion near one end and being resiliently yieldable to form with the adjoining side wall a snap-in socket and a generally U-shaped sheathed tubular electrical heating element having two separate legs extending coextensively in length with said trough and received in snap-in assembly in said sockets disposed adjacent a corresponding diverging side wall.

12. For use as a windshield wiper heater, the invention as defined in claim 11,
    said bottom wall having a centrally disposed aperture formed therein,
    each said bracket on opposite sides of said aperture having formed on the ends thereof outwardly of said recessed retaining portion
        a lug for engaging and retaining the frame of a windshield wiper blade
thereby to position the head member of the windshield wiper blade in the aperture and the squeegee of the windshield wiper blade in the path of thermal energy reflected and radiated out of the open side of the trough-shaped reflector.

References Cited in the file of this patent

UNITED STATES PATENTS

| | | |
|---|---|---|
| 2,255,393 | Osborn | Sept. 9, 1941 |
| 2,469,791 | Schneider | May 10, 1949 |
| 2,923,022 | Theckston | Feb. 2, 1960 |